United States Patent

Wertheim

Patent Number: 5,439,327
Date of Patent: Aug. 8, 1995

[54] METAL CUTTING TOOL

[75] Inventor: Raphael Wertheim, Kiryat Bialik, Israel

[73] Assignee: Iscar Ltd., Migdal Tefen, Israel

[21] Appl. No.: 224,174

[22] Filed: Apr. 7, 1994

Related U.S. Application Data

[63] Continuation of Ser. No. 948,197, Sep. 18, 1992, abandoned.

[30] Foreign Application Priority Data

Sep. 27, 1991 [IL] Israel .......................... 99584

[51] Int. Cl.⁶ .......................................... B23B 27/10
[52] U.S. Cl. ........................................ 407/11; 407/113; 407/117
[58] Field of Search ................ 407/11, 66, 99, 110, 407/113, 114, 117

[56] References Cited

U.S. PATENT DOCUMENTS

| | | | |
|---|---|---|---|
| 1,296,536 | 3/1919 | Leech | 407/11 |
| 2,848,790 | 8/1958 | McMann | 407/11 |
| 3,889,520 | 6/1975 | Stoferle et al. | 407/11 |
| 3,973,308 | 8/1976 | Lundgren | 407/114 |
| 4,302,135 | 11/1981 | Lillie | 407/11 |
| 4,616,962 | 10/1986 | Ushijima et al. | 407/113 |
| 4,992,007 | 2/1991 | Satran | 407/110 |
| 5,085,541 | 2/1992 | Simpson, III | 407/110 |
| 5,148,728 | 9/1992 | Mazurkiewicz | 407/11 |

FOREIGN PATENT DOCUMENTS

| | | | |
|---|---|---|---|
| 100376 | 2/1984 | European Pat. Off. | 407/11 |
| 112806 | 7/1984 | European Pat. Off. | 407/114 |
| 1115922 | 5/1956 | France . | |
| 1222947 | 6/1969 | France . | |
| 2244590 | 4/1975 | France | B23B 27/10 |
| 864348 | 1/1953 | Germany | 407/11 |
| 949613 | 9/1956 | Germany | 407/11 |
| 1070898 | 12/1959 | Germany | 407/11 |
| 1132775 | 7/1962 | Germany | 407/11 |
| 3004166 | 8/1980 | Germany | B23B 27/10 |
| 3033626 | 4/1982 | Germany | 407/11 |
| 3740814 | 6/1989 | Germany | 407/11 |
| 3740814 | 6/1989 | Germany | B23B 27/10 |
| 71903 | 4/1986 | Japan | 407/11 |
| 95590 | 10/1960 | Netherlands | 407/11 |
| 2408 | 8/1872 | United Kingdom | 407/11 |
| 1516399 | 7/1978 | United Kingdom | 407/114 |
| 2212078 | 7/1989 | United Kingdom | 407/11 |
| 607664 | 5/1978 | U.S.S.R. | 407/11 |
| 1127695 | 12/1984 | U.S.S.R. | 407/117 |

*Primary Examiner*—Maurina T. Rachuba
*Attorney, Agent, or Firm*—Pennie & Edmonds

[57] ABSTRACT

A metal cutting tool having a metal cutting tip with at least one cutting edge defined between a rake face and a relief flank and at least one recess formed in said relief flank and constituting a coolant channel and extending towards said cutting edge and being spaced therefrom by a spacing s which is of the order of the prescribed permissible width of flank wear $VB_{max}$.

13 Claims, 4 Drawing Sheets

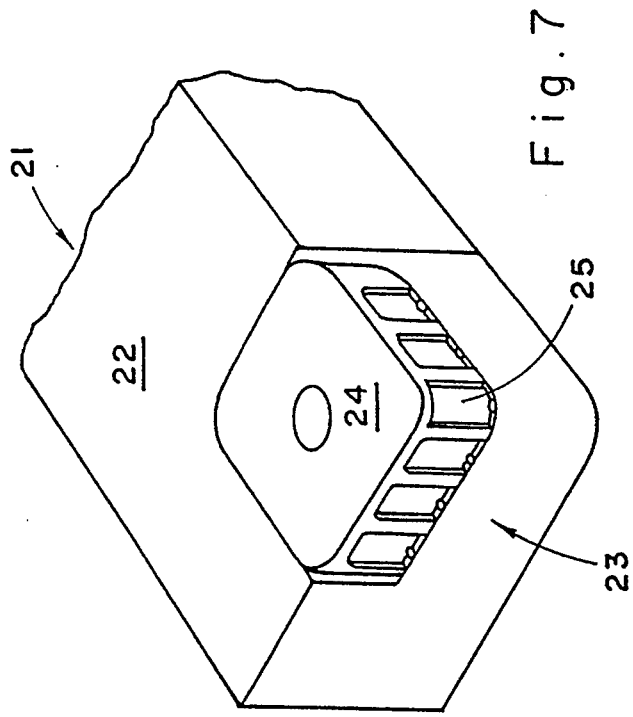
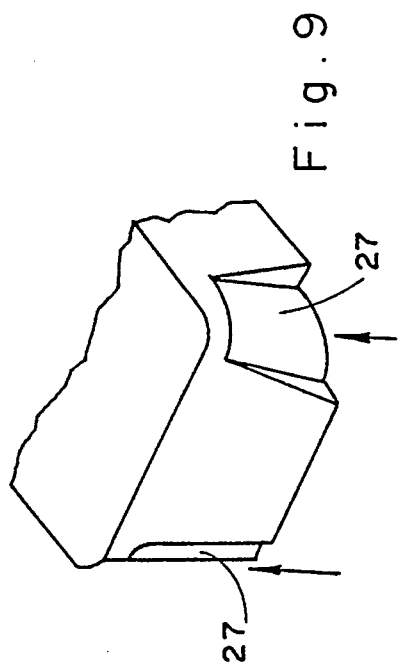
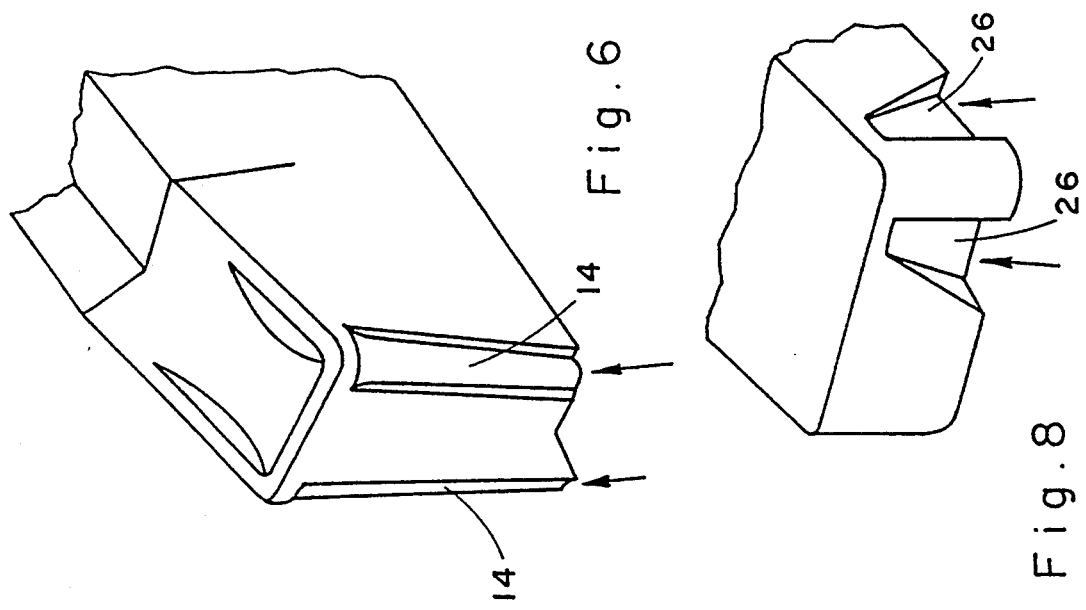

METAL CUTTING TOOL

This is a continuation of application Ser. No. 07/948,197 filed Sep. 18, 1992, now abandoned.

FIELD OF THE INVENTION

This invention relates to a metal cutting tool of the kind having a metal cutting tip which either forms an integral part of the tool or is formed on a metal cutting insert releasably retained in an insert holder of the tool. The invention also relates to metal cutting inserts for use with such metal cutting tools.

BACKGROUND OF THE INVENTION

With such metal cutting tools, the cutting edge of the tip is defined between a rake surface thereof and a relief flank or clearance face and, in use, the cutting edge and the portion of the relief flank adjacent thereto, become rapidly worn and, where the tip is formed on a replaceable insert, the latter must therefore be frequently replaced or rotated so as to index a fresh cutting edge in position. Similarly, where the tip forms an integral part of the cutting tool, the tip must be frequently reset or the entire tool must be replaced.

With such cutting tips there is generally specified (by the manufacturers) a maximum degree of wear of the relief flank after which replacement, resetting or indexing must be effected. This maximum degree of wear is usually specified in terms of the maximum width $VB_{max}$ of wear of the relief flank when measured from the cutting edge. Thus, when the flank wear reaches the specified maximum $VB_{max}$, the tip should be reset or replaced.

It is well-known that one of the factors determining flank wear is the hardness of the cutting tip material. Thus, the harder the material the less will be the rate of wear and the longer the cutting tip can be used before wear has reached $VB_{max}$ requiring replacement. However, this hardness is directly related to the working temperature and with rise of working temperature there is an associated reduction in hardness, with a consequent increase in the rate of wear.

It is for this reason that, in the use of such cutting tools, means have been provided for the fluid cooling of the cutting tip in the region of the cutting edge thereof.

In one known method of fluid cooling, the upper surface of the cutting tip or insert is sprayed with a coolant fluid but it is found that the continued movement of the chip over the rake surface of the cutting insert disturbs the effective cooling of the insert by the coolant.

In another known method of cooling, a coolant is passed through the cutting tip from the base thereof to the upper rake surface. It is found in practice, however, that the pressure of the chip on the upper rake surface prevents the coolant from effectively reaching the region of the cutting edge, and here again the efficiency of cooling is limited.

A further method which has been employed has been to direct a coolant through a duct formed in the cutting insert or cutting tip, which duct emerges from an aperture in the relief flank of the cutting insert. It is found, however, that in order to ensure effective distribution of the coolant liquid around the relief flank and in the vicinity of the cutting edge, a number of such coolant ducts must be provided and this, in turn, leads to a significant weakening of the cutting tip. Furthermore, the penetration of the coolant is hindered by the narrow gap between the relief flank and the workpiece.

It has also been proposed to direct a jet of a coolant liquid into the space between the relief flank and the workpiece, but this method is of very limited value, particularly when the tool involved is a grooving or parting tool, seeing that the region between the relief flank and the workpiece is of extremely limited accessibility as compared with a turning tool.

BRIEF SUMMARY OF THE INVENTION

It is therefore an object of the present invention to provide a metal cutting tool having a metal cutting tip, and which is provided with fluid coolant means wherein the above-referred-to disadvantages are substantially reduced or overcome.

It is equally an object of the present invention to provide a metal cutting insert for use in a metal cutting tool, provided with fluid coolant means wherein these disadvantages are substantially reduced or overcome.

According to the present invention there is provided a metal cutting tool having a metal cutting tip with at least one cutting edge defined between a rake face and a relief flank and at least one recess formed in the relief flank and constituting a coolant channel extending towards said cutting edge and being spaced therefrom by a spacing s which is of the order of a prescribed permissible extent of flank wear $VB_{max}$ of the tip.

Preferably, the cutting tip is constituted by a replaceable cutting insert, the tool furthermore comprising an insert holder for releasably retaining the insert.

With such a cutting tool, whether having an integrally formed cutting tip or a replaceable cutting insert, coolant is directed into the coolant channel formed in the relief flank of the tip and is thus guided to and concentrated in the region of expected flank wear. Thus, cooling takes place in the region of the cutting insert where it is most required and, in this way, the rate of flank wear is significantly reduced. This, in turn, reduces the frequency with which cutting inserts have to be replaced when the wear thereof has reached the maximum permissible level.

In one particular embodiment, the recess extends from and through the base of the insert and communicate with the outlet of a fluid coolant duct formed in the insert holder.

Preferably, s lies substantially within the range $VB_{max}$ to 4 $VB_{max}$, with the preferred value being substantially equal to 1.5 $V_{max}$.

BRIEF DESCRIPTION OF THE DRAWINGS

Various embodiments of metal cutting inserts in accordance with the present invention will now be described by way of example and with reference to the accompanying drawings, in which

FIGS. 5 and 6 are schematic views of differing forms of inserts in accordance with the invention;

FIG. 7 is a schematic perspective view of a portion of a milling or turning tool fitted with a replaceable insert in accordance with the invention; and FIGS. 8 and 9 are views of differing forms of turning or milling inserts in accordance with the invention.

DETAILED DESCRIPTION OF PREFERRED EMBODIMENTS

Figure 1:
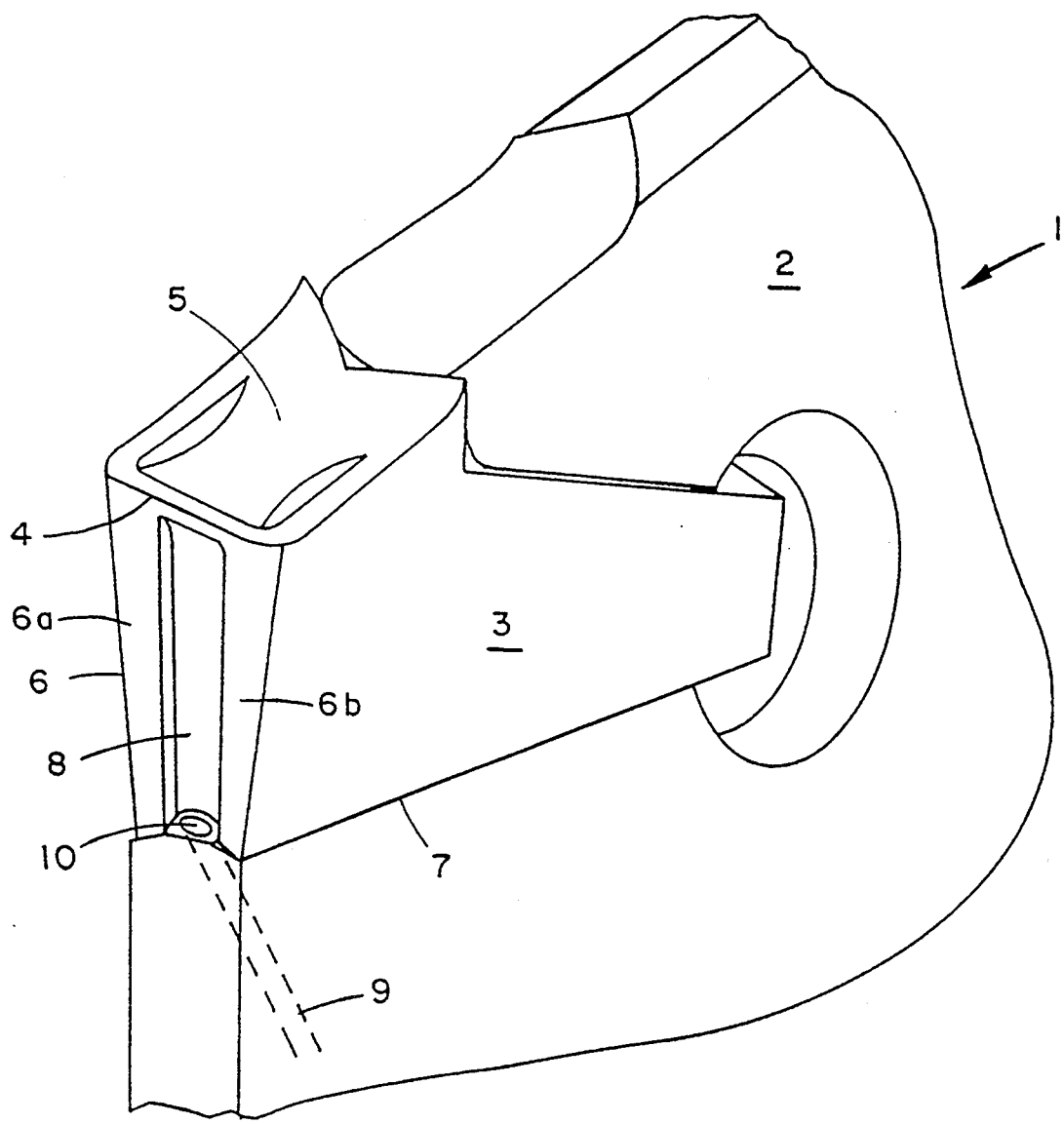
FIG. 1 is a schematic perspective view of a part of a grooving or parting tool in accordance with the invention and fitted with a replaceable insert.

Referring to FIG. 1, there is here shown schematically a grooving or parting tool 1 having a tool holder 2 in which is wedge clamped a replaceable cutting insert 3 having a cutting edge 4 defined between an upper rake surface 5 and a front relief flank 6.

Formed in the relief flank 6 and extending from a base 7 of the insert 3 is an elongated recess 8 constituting a coolant channel, the recess being bounded on either side by unrecessed portions 6a and 6b of the relief flank 6.

A coolant duct 9 is formed in the insert holder 2 and has an outlet aperture 10 which communicates with the open, lower end of the recess 8.

Figure 2:
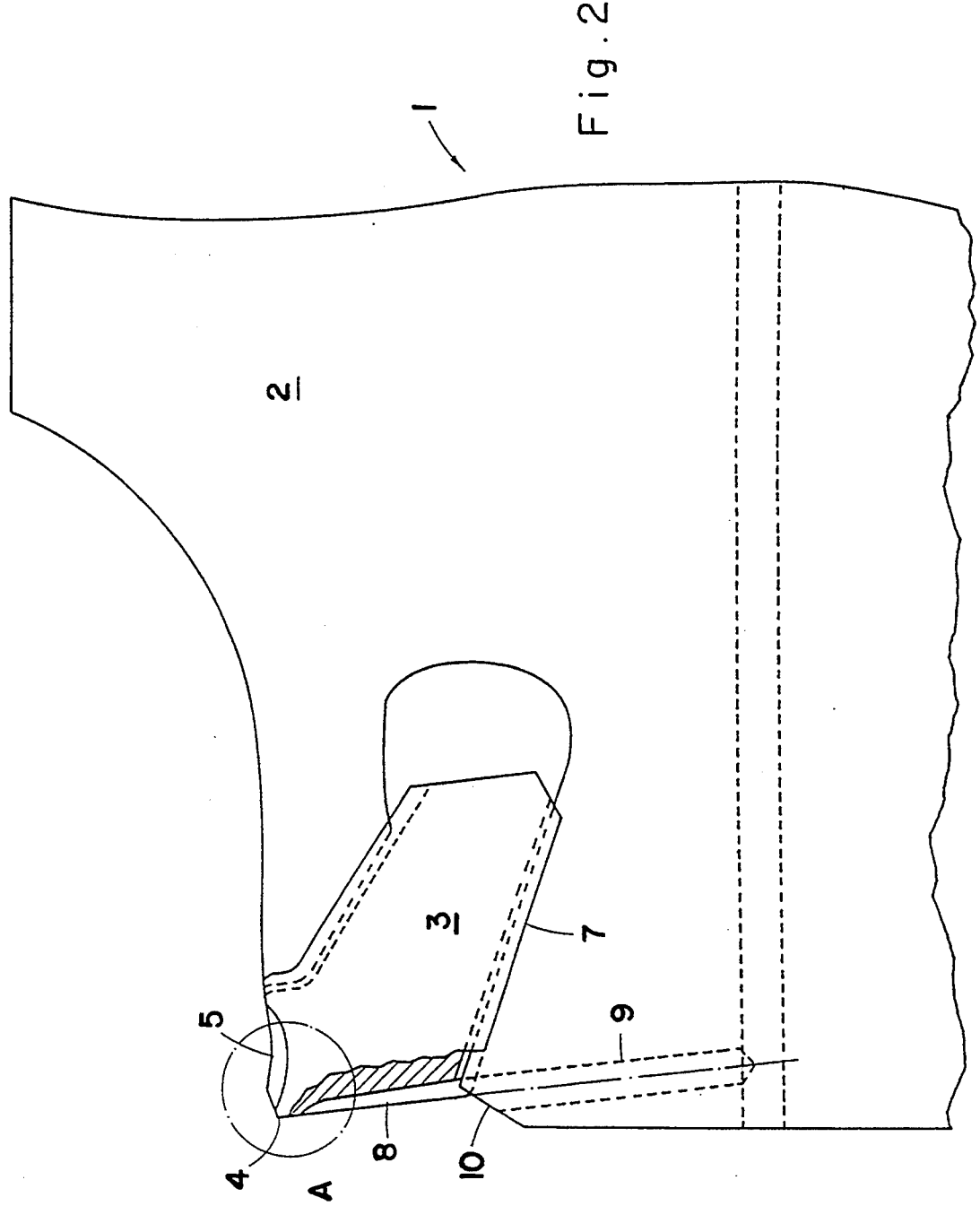
FIG. 2 is a side elevation (partially sectioned) of the tool shown in FIG. 1.
Figure 3:
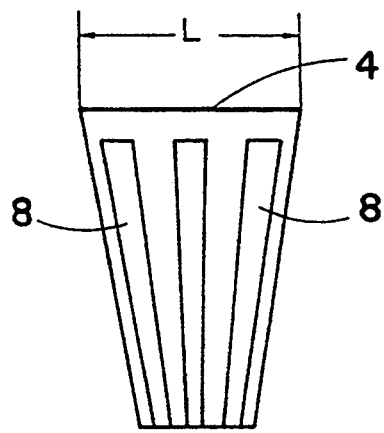
FIG. 3 is a schematic front elevation of a relief flank of a replaceable insert in accordance with the invention.
Figure 4:
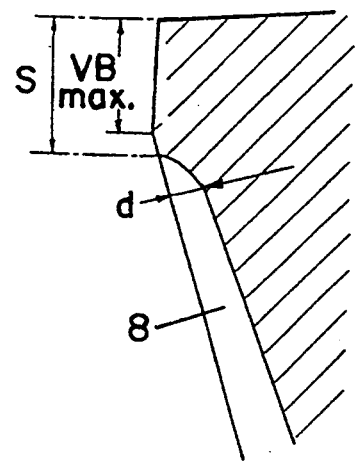
FIG. 4 is an enlarged view of detail A of the tool shown in FIG. 2.

As can be seen in FIGS. 2, 3 and 4 of the drawings, the recess 8 tapers in depth from the broadest depth in the region of the base towards the direction of the cutting edge. The upper extremity of the recess is spaced from the cutting edge by a spacing s. FIG. 4 shows the prescribed maximum permissible extent of flank wear $VB_{max}$.

As can be seen, s is slightly greater than $VB_{max}$, the invention requiring that s is of the order of $VB_{max}$. Preferably, s lies substantially within the range of $VB_{max}$ and 4 $VB_{max}$ with a preferred value of s being substantially equal to 1.5 $VB_{max}$.

On the other hand, the depth d of the recess 8 in the region closest to the insert base should be greater than or equal to the spacing s, the preferred value being that the depth d is substantially equal to 2 $VB_{max}$.

In the embodiment shown in FIG. 1, the relief flank 6 is provided with a single, centrally-disposed recess 8, the relief flank 6 being bounded on either side thereof by unrecessed portions 6a, 6b thereof.

Depending on the size of the cutting inserts, the relief flank 6 can be provided with a plurality of such coolant recesses 8 (as, for example, shown in FIG. 3 of the drawings) and whilst the general considerations outlined above in connection with the spacing of these coolant recesses from the cutting edge apply to the situation where a plurality of such recesses are provided, the actual locations of the terminal positions of the recesses adjacent the cutting edge may differ slightly one from the other.

Figure 5:
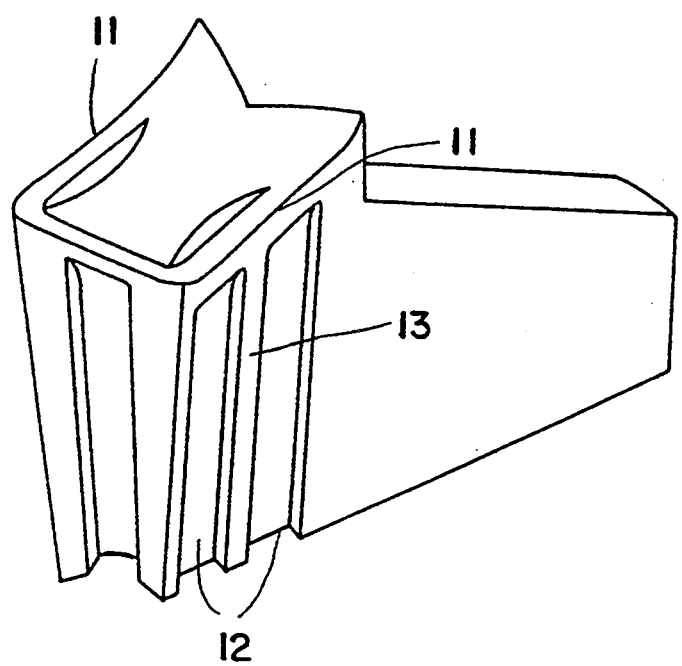

Both for the case where the relief flank is provided with a single coolant recess and for the case where the relief flank is provided with a plurality of such coolant recesses, the overall transverse extent of the recess or recesses W, i.e. the sum total of the transverse dimensions thereof as measured in a direction extending parallel to the cutting edge, should lie within the range of 0.2 L to 0.7 L, where L (as seen in FIG. 3) is the transverse extent or length of the cutting edge as a whole.

Where the insert is designed for use in turning (as, for example, in tools known by the trademark CUT-GRIP), the tool, as shown in FIG. 5, is provided with side cutting edges 11 and with coolant recesses 12 formed in side relief flanks 13.

In the embodiment shown in FIG. 6 of the drawings, coolant recesses 14 are formed at the corners defined by side and front relief flanks and extend towards the corners of the cutting edge. Such an arrangement is believed to be advantageous, seeing that in practice it is found that the magnitude of $VB_{max}$ at the corners is greater than in the central positions, and cooling which is concentrated at the corners is believed to be particularly effective in reducing the rate of flank wear.

Reference will now be made to FIGS. 7, 8 and 9 of the drawings, where there are illustrated the application of the invention to a turning tool. As seen in FIG. 7, a turning tool 21 comprises a holder 22 formed with a pocket 23 in which is fitted a turning insert 24. In the case of this turning insert, clearance faces of the insert 24 are provided with a succession of coolant recesses 25.

In FIGS. 8 and 9 are shown various alternative locations for the coolant recesses in the insert of the tool. Thus, in FIG. 8 the recesses 26 are adjacent the insert corners whilst in FIG. 9 the recesses 27 are located at the insert corners. The recesses 25, 26 and 27 extend as before to a region of the insert adjacent the cutting edges and spaced therefrom by a spacing of the order of the maximum permissible depth of flank wear. The recesses extend into the base of the insert and communicate there with outlet apertures of coolant ducts formed in the holder 22.

Whilst in all the embodiments described above the coolant channels communicate with the outlets of coolant ducts formed in the holders and coolant fluid emerging from these outlets pass through the coolant channels and are guided thereby into the region adjacent the cutting edges, in other embodiments (not illustrated) coolant fluid may be directed into the coolant channels from externally disposed coolant ducts or nozzles.

Furthermore, whilst in all the embodiments described above the coolant channels extend into and through the base of the inserts, the invention is equally applicable to the situation where the coolant channel extends from the region of the base but not necessarily through the base. In such embodiments, the coolant fluid is directed into the coolant channels from externally located ducts or nozzles.

Whilst in all the embodiments described above the invention has been applied to replaceable cutting inserts, it will be understood that the invention is equally applicable in the case of cutting tools having integrally formed cutting tips.

I claim:

1. A metal cutting tool having a metal cutting tip with a rake face and a relief flank at least one cutting edge defined therebetween; and at least one groove formed in the surface of said relief flank and bounded on either side by unrecessed portions of said relief flank and constituting a coolant channel and extending towards said cutting edge and being spaced therefrom by a spacing s; whereby in use the spacing s is at least about equal to a prescribed permissible extent of flank wear as measured in a direction from said cutting edge along said relief flank.

2. A metal cutting tool according to claim 1, wherein said cutting tip is constituted by a replaceable cutting insert and said metal cutting tool further comprises an insert holder for releasably retaining said insert.

3. A metal cutting tool according to claim 2, wherein said insert holder is formed with a fluid coolant duct through which coolant fluid can be directed into said coolant channel.

4. A metal cutting insert for use in a metal cutting tool, said insert comprising a rake face and a relief flank at least one cutting edge defined therebetween, a base;

and at least one groove formed in the surface of said relief flank and bounded on either side by unrecessed portions of said relief flank and constituting a coolant channel and extending from the region of said base of the insert towards said cutting edge and being spaced therefrom by a spacing s; whereby in use the spacing s is at least about equal to a prescribed permissible extent of flank wear as measured in a direction from said cutting edge along said relief flank.

5. An insert according to claim 4, wherein said groove extends from and through said base.

6. An insert according to claim 4, wherein said relief flank is bounded on either side thereof by unrecessed portions thereof.

7. An insert according to claim 4, where s is of a value ranging between said prescribed permissible extent of flank wear and four times said prescribed permissible extent of flank wear.

8. An insert according to claim 7, wherein s is substantially equal to 1.5 times said prescribed permissible extent of flank wear.

9. An insert according to claim 4, wherein said groove has a depth d in the region thereof closest to the insert base wherein d is substantially equal to 2 times said prescribed permissible extent of flank wear.

10. An insert according to claim 4, wherein the total transverse extent W of the grooves as measured in a direction extending parallel to said cutting edge lies substantially within a range of 0.2 L to 0.7 L, where L is the length of the cutting edge.

11. An insert according to claim 4, further comprising first and second side relief flanks adjacent to and on either side respectively of said relief flank, said first and second side relief flanks defining respectively first and second corners in relation to said relief flank, wherein first and second corner grooves are formed in said first and second corners of said insert.

12. An insert according to claim 4, wherein said relief flank is a front relief flank.

13. An insert according to claim 4, further comprising a plurality of relief flanks and a plurality of cutting edges respectively defined between said rake face and said plurality of relief flanks and wherein at least one groove is formed in the surface of each relief flank.

* * * * *